March 6, 1934.   A. L. HESS   1,949,962
TOW BAR FOR CYCLES
Filed Feb. 21, 1931   2 Sheets-Sheet 1
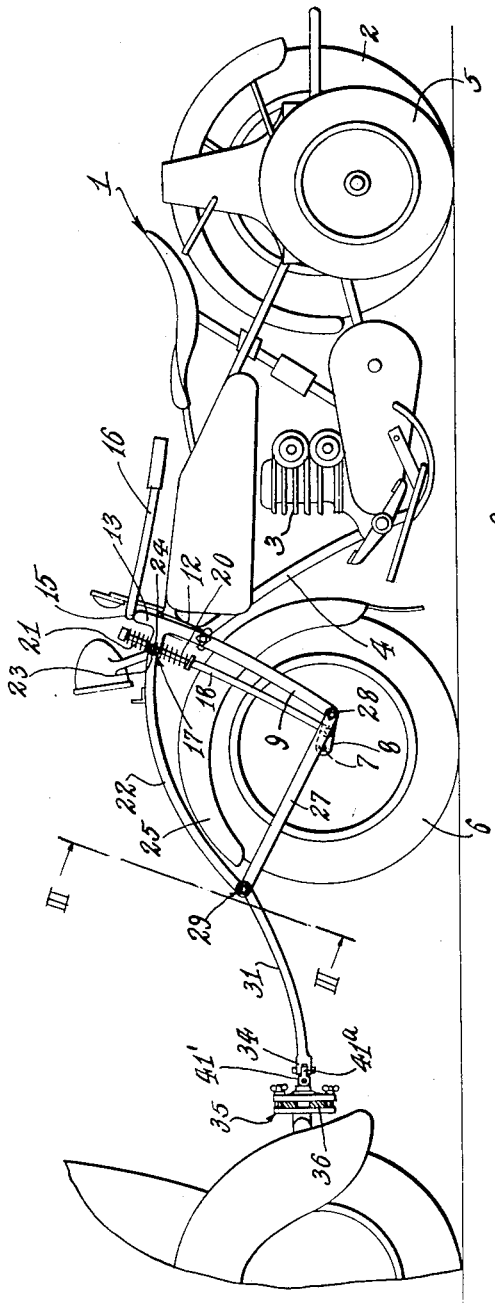
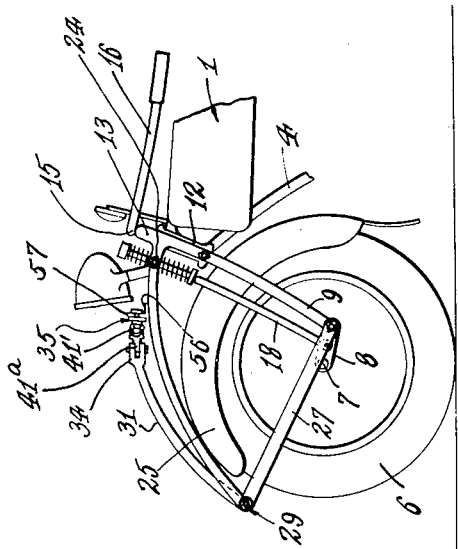
Inventor
Albert Laurance Hess
By Lyon & Lyon
Attorneys March 6, 1934. A. L. HESS 1,949,962
TOW BAR FOR CYCLES
Filed Feb. 21, 1931   2 Sheets-Sheet 2
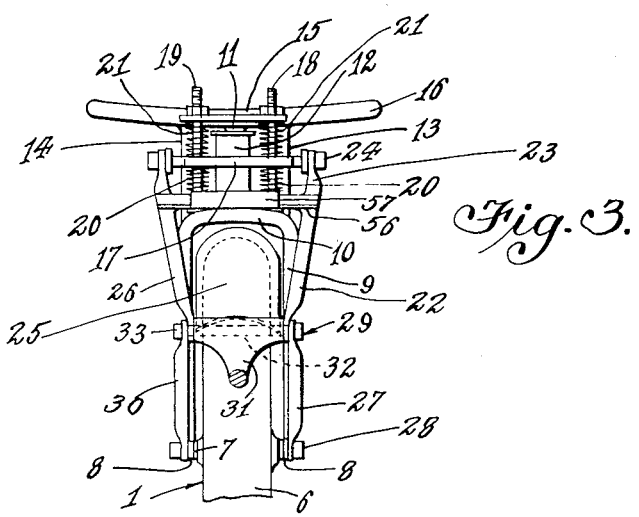
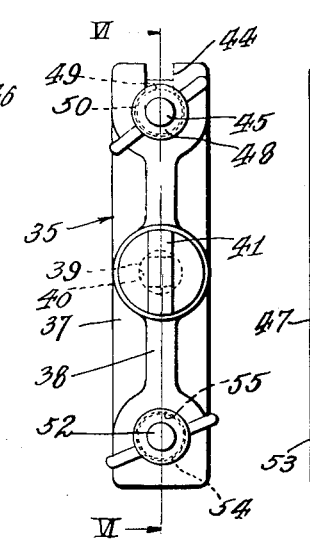
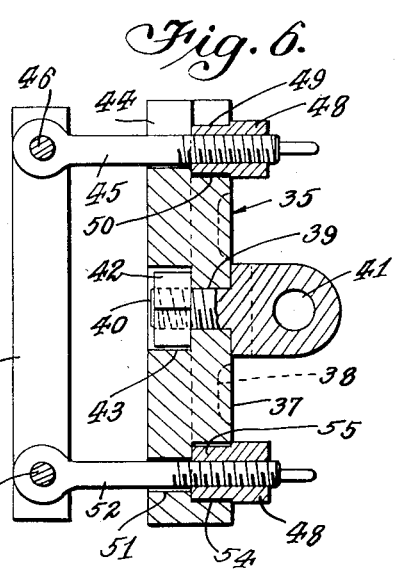
Inventor
Albert Laurance Hess
By Lyon & Lyon
Attorneys Patented Mar. 6, 1934

1,949,962

UNITED STATES PATENT OFFICE 1,949,962

TOW BAR FOR CYCLES

Albert Laurance Hess, Los Angeles, Calif., assignor to Cycletow Corporation, Ltd., Los Angeles, Calif., a corporation of California Application February 21, 1931, Serial No. 517,413

10 Claims. (Cl. 208—27)

My invention relates to towable cycles and has particular reference to a tow bar or coupling for connecting a bicycle or motorcycle to another vehicle to permit the cycle to be towed by that vehicle.

In my copending application, Serial No. 378,096, filed July 13, 1929, on which Patent No. 1,855,172 was granted April 19, 1932, I disclosed a bicycle or motorcycle equipped with auxiliary wheels to permit the same to remain upright while it is towed by another vehicle. Such motorcycles are particularly adapted to be towed by automobiles by connecting the cycle to the automobile through the agency of a tow bar which connects the front wheel assembly of the cycle to the towing vehicle.

It is an object of my invention to provide a tow bar or connecting device for connecting the front wheel assembly of a bicycle or motorcycle to a towing vehicle.

Another object of my invention is to provide a tow bar or connecting device of the character described in which the tow bar may be folded back upon itself when the cycle is to be operated under its own power.

Another object of my invention is to provide a tow bar or connecting device of the character described in which rigid connection may be made between the tow bar assembly and the front wheel assembly of the motorcycle or bicycle.

Another object of my invention is to provide a readily adjustable coupling device for connecting the tow bar to the vehicle by which it is to be towed.

Other objects of my invention will be apparent from a study of the following specification read in connection with the accompanying drawings, wherein Figure 1 is a side elevational view of a motorcycle equipped with a towing connection constructed in accordance with my invention.

Figure 2 is a detailed view in side elevation of a portion of the motorcycle shown in Figure 1 and illustrating the tow bar in its folded position.

Figure 3 is a front elevational view taken along the line III—III of Figure 1.

Figure 4 is a detailed view in front elevation of the connecting clamp employed with my tow bar.

Figure 5 is a detailed view in rear elevation of the connecting clamp employed with my tow bar, and Figure 6 is a vertical sectional view of the clamp shown in Figure 5, this view being taken along the line VI—VI of Figure 5.

Referring to Figure 1, I have illustrated a motorcycle 1, having the usual traction wheel 2 driven by means of an engine 3 secured to the frame 4 of the motorcycle proper.

The motorcycle 1 is illustrated as being equipped with a pair of auxiliary wheels 5 (only one of which is shown), connected in any suitable manner to the motorcycle frame 4 to insure the motorcycle remaining in upright position when either standing still or when it is being towed.

The present invention does not deal particularly with the auxiliary wheel mechanism 5 and no detailed description thereof is deemed necessary.

The motorcycle 1 is illustrated as being equipped with a front or steering wheel 6 suspended in the usual manner upon an axle 7 connected by means of a link 8 to a front fork 9. The front fork 9 constitutes a relatively U-shaped member in inverted position straddling the front wheel 6, the base of the U constituting a cross-bar 10 to which is rigidly connected a tube 11 which fits within and rotates within an enclosed tube 12 rigidly secured to the stationary portion of the frame 4.

The legs of the U-shaped fork 9 are provided with extensions 13 and 14 which extend upwardly into rigid engagement with the cross-piece 15 constituting a portion of the handle bars 16 by which the motorcycle is steered.

Intermediate the base 10 of the U-shaped fork 9 and the connection of the extending legs 13 and 14 from the handle bars 15 is a forwardly projecting plate 17 through which project the upper ends of a pair of rods 18 and 19. These rods connecting with the link 8 intermediate its ends and being provided with compression springs 20 and 21, both above and below the plate 17 so that the assembly 18, 19 and springs 20, 21 constitute a spring suspension for the front or steering wheel 6 of the motorcycle to permit its riding over irregularities in the path traversed by the vehicle without transmitting unnecessary shock to the motorcycle 1.

A strut 22 is illustrated as being connected at one of its ends 23 to the plate 17 as by means of screws or bolts 24, the opposite end of the strut 22 extending forwardly and above the wheel 6 and its associated mud guard 25 to a point just in advance of a vertical line tangent to the front of the wheel 6. A similar strut 26 is illustrated as being similarly connected from the opposite side of the wheel 6.

A brace 27 is illustrated as being connected at one of its ends 28 to the lower end of one side of the fork 9, preferably, this connection being made through the same bolt or connecting member which secures the fork 9 to the link 8. The opposite end of the brace 27 connects with the forward end of the strut 22 as is indicated at 29. A similar brace 30 is similarly connected upon the opposite side of the wheel 6.

Between the joints of strut 22—brace 27 and strut 26—brace 30, is connected to the rear end of a tow bar 31, this end of the tow bar being preferably provided with a laterally extending bore 32 through which a single bolt 33 may be passed to constitute a unitary securing device for holding the forward ends of brace 30, strut 26, strut 22 and brace 27 in assembled relation.

The two side braces 27 and 30 together with the two struts 22 and 26, best shown in Figs. 1 and 3, constitute as an assembly a bracket, a portion of which extends forwardly of the front wheel, this portion being the juncture of the several elements where the tow bar 31 itself is also connected. The assembly of struts and braces above referred to forms a rigid structure preferably composed of the separate elements but obviously a structure which could be made of a single integral body.

The tow bar 31 is illustrated in Figure 1 as being in its extended position so that its forward end, bifurcated as at 34 may be connected to a clamp 35 which in turn may be secured to the rear bumper 36 of a vehicle which is to tow the motorcycle.

Referring particularly to Figures 4, 5 and 6, I have illustrated therein a form of clamp adaptable to the tow bar 31 as comprising a base 37 substantially rectangular in shape and having an upstanding strengthening flange 38 formed upon the rear side thereof through which a bore 39 extends to receive therethrough, a bolt 40, one end of which is provided with an eyelet 41 having substantially parallel faces spaced from each other by such dimension as will permit the eyelet 41 to be inserted in the bifurcated end 41' of a link 41a, the opposite end of which is receivable in the bifurcated end 34 of the tow bar 31.

The inner end of the bolt 40 may be secured against removal from the base 37 as by means of a suitable nut 42 which when threaded upon the bolt 40 seats within a recess 43 so that the entire bolt and nut structure lies below the surface of the base 37.

At one end of the base 37 is provided a longitudinally extending slot 44 adapted to receive therein the threaded end of an eye-bolt 45 pivotally connected as at 46 to a clamping plate 47. The threaded end of the bolt 45 is provided with a wing-nut 48. The wing-nut is preferably formed with an extending boss or shoulder 49 which seats in an enlarged opening 50 at the base of the slot 44, the enlarged opening 50 constituting a substantially key-hole opening with the slot 44 such that when the wing-nut 48 is tightened the bolt 45 is prevented from laterally moving out of the slot 44.

At the opposite end of the base 37 is provided a bore 51 through which the threaded end of an eye-bolt 52 may extend, the eye-bolt 52 being similar in all respects to the eye-bolt 45 and pivotally connected as at 53 to the opposite end of the clamping plate 47. The bore 51 is provided with an enlarged portion 54 adapted to receive an extending boss 55 upon the wing-nut 48 which is adapted to be threaded upon the bolt 51. The wing-nuts for both bolts 45 and 52 are identical in construction. This structure constitutes a connection between the clamping plate 47 and the base 37 which permits ready adjustment of the distance between the plate 47 and base 37 and which permits one of the eye-bolts 45 to be swung outwardly from its connection with the base 37 without permitting complete separation of the clamping plate and base.

The clamping plate 37 is illustrated as being formed of two rectangular strips of metal, arranged one on each side of the eye-bolt 45 and secured thereto as by means of the pivot pin 46 which may be riveted or otherwise secured against removal from the plates 47.

The operation of the tow bar construction is herein described as follows:

A motorcycle equipped with auxiliary wheels 5 or with other suitable mechanism which will hold the motorcycle upright while it is being towed and having a tow bar construction such as that herein described, connected to the front fork structure thereof may be connected for towing purposes by removing or loosening the wing nuts 48 upon the clamp 35 to permit the bumper 36 of the towing vehicle to be inserted between the plates 47 and the base 37. The wing nuts then being tightened into secure clamping relation with the bumper 36 provides a rigid connection between the towing vehicle and the motorcycle.

It will be observed that the assembly of the eyelet 41 of the bolt 40 with the link 41a and the end 34 of the tow bar 31 constitutes in effect a universal joint permitting relative movement of the clamp 35 and the tow bar 31 in the normal movements of the towing vehicle and the motorcycle but which provides a coupling between the tow bar 31 and the towing vehicle preventing any relative longitudinal movement of the two.

When the clamp is in place as herein described the towing strain is transmitted to the front fork 9 of the motorcycle and is distributed both to the upper and lower ends of the fork to insure correct distribution of the strain over the entire fork and avoiding undesirable lifting stress tending to lift the front wheel 6 of the motorcycle from the ground during starting and stopping of the towing vehicle as in ordinary operation in traffic.

Moreover, it will be observed that the point of attachment of the tow bar structure to the front fork 9 is such that the normal bolts and studs employed in the motorcycle assembly are also employed as the attaching means for the tow bar structure.

When the towing vehicle is disconnected from the motorcycle the motorcycle may be ridden or operated in the usual manner by folding the tow bar 31 to the position illustrated in Figure 2. Any desirable means for maintaining the tow bar 31 in the folded position may be utilized, though I prefer to provide a short section of angle bar 56 extending laterally across the struts 22 and 26. The upstanding web 57 of which may be cut away as is indicated in Figure 3 to provide an upstanding lug receivable by the clamp 35 so that by tightening the clamp 35 on the lug 57 the tow bar 31 is retained in this folded position.

While I have illustrated and described the preferred embodiment of my invention, I do not desire to be limited to any of the details illustrated and described herein except as defined in the appended claims.

I claim:

1. A tow bar construction for motorcycles comprising a pair of braces secured to the lower end of the front fork assembly of the motorcycle on opposite sides of the front wheel respectively, means connecting the opposite ends of said braces to the upper portion of said front fork assembly adjacent the upper end thereof, a tow bar pivotally connected to the outer ends of said braces, a clamp for attachment to a towing vehicle secured to the outer end of said tow bar, and means secured to said connecting means in such position as to receive said clamp when said two bar is folded back upon its pivot.

2. In a tow bar assembly for motorcycles, a pair of braces, the inner end of each of which is connected to the lower end of the front fork assembly of said motorcycle at the point of attachment of said front fork to the front wheel of the motorcycle, means connecting the outer ends of said braces to the upper portion of the front fork assembly of said motorcycle, a tow bar pivotally connected to the outer ends of said braces for movement in a vertical plane relative to said motorcycle, and a clamp secured to the outer end of said tow bar for attachment to a towing vehicle.

3. A connecting clamp for coupling a towed vehicle to a towing vehicle, comprising a substantially rectangular base provided with a slot in one end thereof and a bore at the other end thereof, a clamping plate of substantially the same length as said base and having bolts pivotally secured to opposite ends thereof, said bolts being receivable in the slot and bore respectively of said base, and a connecting member swiveled near the center of said base for coupling the same to a connecting or coupling bar.

4. A connecting clamp for coupling a towed vehicle to a towing vehicle, comprising a substantially rectangular base having a slot formed in one end thereof and a bore formed in the other end thereof, said slot and bore each terminating in an enlarged opening, a clamping plate of substantially the same length as said base and having pivotally secured at each end thereof an eye-bolt receivable in the slot and bore respectively of said base, a shouldered wing-nut threaded upon each of said eye-bolts, the extending shoulder of which is adapted to seat in the enlarged portion of said slot and bore, and a connecting member swiveled to said base for connecting the same to a connecting or coupling bar.

5. A tow bar assembly for a motorcycle comprising a bracket rigidly connected to the front wheel fork assembly of the motorcycle, and having a portion thereof extending forwardly of the front wheel, a tow bar pivotally connected with said portion and provided with means for connecting the bar to another vehicle, said tow bar being foldable at said pivotal connection rearwardly and upwardly over said front wheel, and means for retaining said bar in said folded position.

6. A tow bar assembly for a motorcycle comprising a bracket rigidly connected to the front wheel fork assembly of the motorcycle, and having a portion thereof extending forwardly of the front wheel, and a tow bar pivotally connected with said portion and provided with means for connecting the bar to another vehicle, said tow bar being foldable at said pivotal connection rearwardly and upwardly over said front wheel.

7. In combination with a motorcycle, a member connected with the front fork of the cycle to turn as a unit therewith, and a tow bar for attachment to another vehicle pivotally connected with said member forwardly of the front wheel axle, said bar being constructed to fold backwardly at said pivotal connection when out of use and to lie inclined toward but lower than the front handle bars of the cycle.

8. In combination with a motorcycle, a forwardly extending member connected with the front fork of the cycle to turn as a unit therewith, and a tow bar for attachment to another vehicle pivotally connected with said member forwardly of the front wheel, said bar being so constructed and connected when swung backwardly about said connection when out of use as to lie inclined forwardly of the handle bars and below the driver's line of vision.

9. In combination with a motorcycle, a forwardly extending member connected with the front fork of the cycle to turn as a unit therewith, a tow bar for attachment to another vehicle pivotally connected with said member so far forwardly of the front wheel that said bar can be swung upwardly about said connection when out of use to lie inclined forwardly of the handle bars and below the driver's line of vision, and means for connecting said bar to another vehicle.

10. In combination with a motorcycle, a forwardly extending member connected with the cycle front fork to turn as a unit therewith, and a tow bar for attachment to another vehicle pivotally connected with said member forwardly of the front wheel at a distance from the handle bars not less than the length of the bar, said bar when swung back out of use being curved to lie over the front wheel.

ALBERT LAURANCE HESS.